United States Patent [19]
Trush

[11] 3,889,161
[45] June 10, 1975

[54] ELECTRONIC CONTROL SYSTEM

[76] Inventor: Steven F. Trush, P.O. Box K (Cross Ave.), Morrisville, N.Y. 13408

[22] Filed: Nov. 16, 1973

[21] Appl. No.: 416,570

[52] U.S. Cl. ... 317/148.5 B; 307/257 F; 317/DIG. 1
[51] Int. Cl. .......................................... H01h 47/32
[58] Field of Search............ 307/252 F, 252 B, 310, 307/301, 278, 305, 308, 309, 117; 317/148.5 R, 148.5 B, DIG. 1, DIG. 3, DIG. 5, 132; 328/115, 132, 150; 219/501

[56] References Cited
UNITED STATES PATENTS

| | | | |
|---|---|---|---|
| 3,648,074 | 3/1972 | Nurnberg | 307/310 |
| 3,689,807 | 9/1972 | Tenenbaum | 307/252 F |
| 3,739,198 | 6/1973 | Clements | 307/252 F |

OTHER PUBLICATIONS
"Voltage Monitor is Easy on both Battery and Budget" Electronics, Oct. 1970, p. 87.

Primary Examiner—J. D. Miller
Assistant Examiner—Harry E. Moose, Jr.
Attorney, Agent, or Firm—Jessup & Beecher

[57] ABSTRACT

An electronic control system is provided which has particular application for monitoring purposes, and which is capable of sensing minute resistance changes in a sensing element to operate a relay or other control or indicator device. The sensing element, for example, may be of the type which changes resistance in the presence of corresponding variations in light, heat or moisture conditions to which the sensing element is exposed. The control system includes a programable unijunction transistor connected to the sensing element so that when the resistance of the sensing element falls below a preset threshold, the unijunction transistor becomes conductive. The unijunction transistor is connected to an electrically energized indicator, or an electrically activated control device, through a relay, for example, or through a bidirectional triode thyristor (Triac). The control system can be constructed to be reset by the return of the sensing element to its original resistance value; or it can be made to latch when the resistance of the control element drops, so that the load remains activated even after the sensing element returns to its normal resistance value. The latching type of circuit can be reset by momentarily interrupting the exciting power.

8 Claims, 3 Drawing Figures

ELECTRONIC CONTROL SYSTEM

BACKGROUND OF THE INVENTION

Monitoring systems are known to the art which include sensing elements that respond to changes in light, heat or moisture to exhibit a corresponding variation in internal resistance. Such prior art systems also include appropriate circuitry for operating an electrically activated indicator or control device in response to such a variation in the resistance of the sensing element in excess of a predetermined range.

The present invention provides such a system which is of solid state construction, and which includes a programable unijunction transistor that is capable of responding to extremely small resistance changes of the sensing element to provide the desired control effect. The system to be described operates on low microampere alternating current so as to minimize electric hazards, electrolysis and control problems. The system is also capable of a wide range of resistance sensitivities, and it is easily adjustable merely by changing the resistance of a resistance element included in the circuit.

In general, the invention provides an improved energizing system and circuit for an indicator, control, or the like, which is simple in its construction, and which operates with a high degree of sensitivity and reliability.

The solid state control system to be described includes a programable unijunction transistor connected in circuit with a relay or Triac. Power for the system is derived from an alternating current source. The alternating current power is rectified, regulated and partially filtered, and it is then applied to the unijunction transistor. The sensing element is connected to the gate of the unijunction transistor; and when the resistance of the sensing element drops below a certain value, the unijunction transistor becomes conductive to activate the relay or Triac.

DETAILED DESCRIPTION OF THE ILLUSTRATED EMBODIMENT

Figure 1:
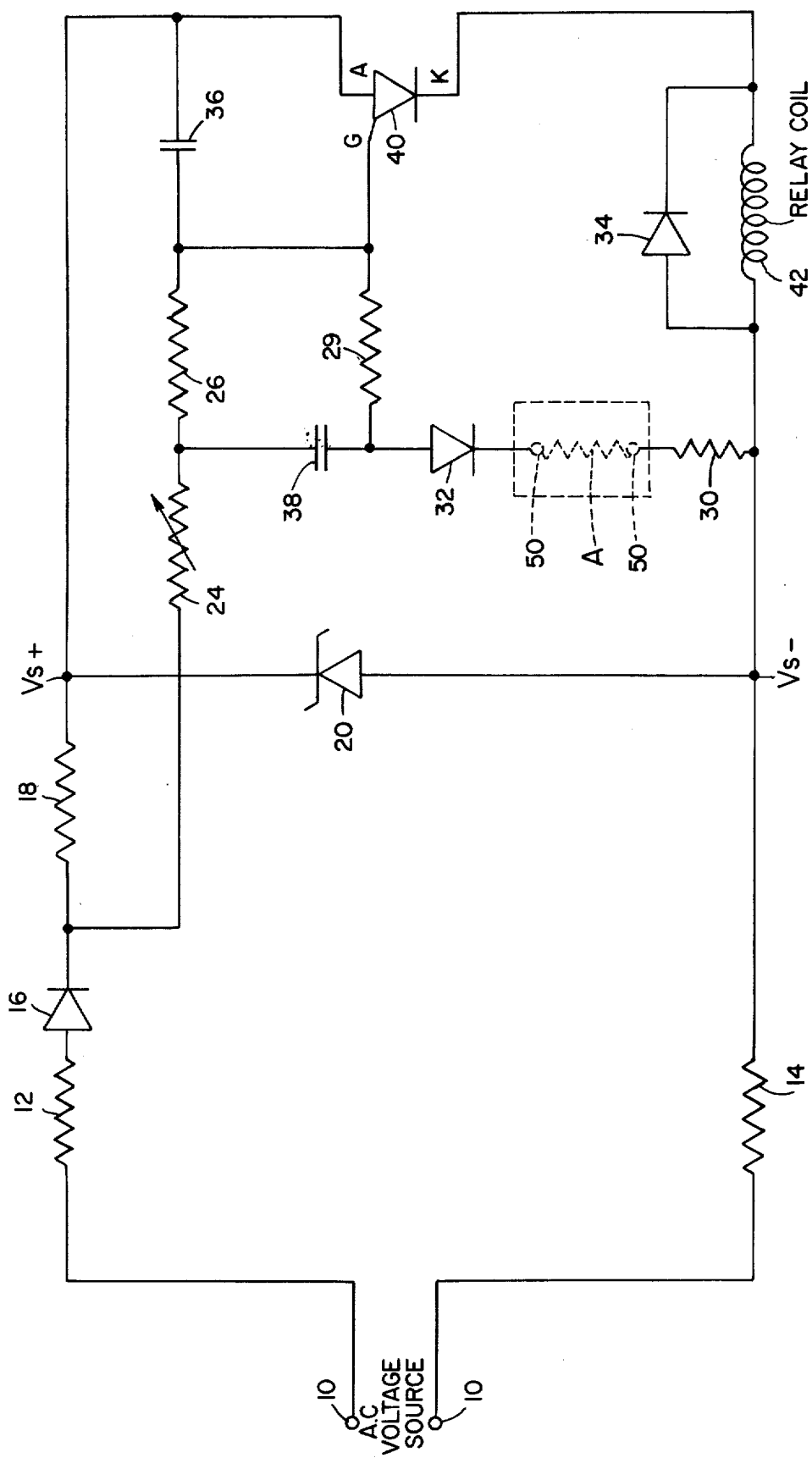
FIG. 1 is a circuit diagram representing one embodiment of the invention in which the control circuit is connected to the coil of a relay.

The circuit of FIG. 1 includes a pair of input terminals 10 which are connected to an appropriate alternating current source, such as the usual 120-volt alternating current power line. One of the terminals 10 is connected to a 2 kilo-ohm resistor 12 which in turn is connected to the anode of a diode 16. The other terminal 10 is connected to a 680 ohm resistor 14. The resistor 14 is connected to a lead designated $V_x-$, and the cathode of the diode 16 is connected through a 47 ohm resistor 18 to a lead designated $V_x+$. A Zener diode 20 is connected between the leads $V_x+$ and $V_x-$, and the unidirectional operating potential $V_x$ is established across these leads.

The purpose of the resistors 12 and 14 is to provide the proper operating value for the unidirectional voltage $V_x$, and also to act as surge limiting resistors for the Zener diode 20. The resistor 18 serves to provide a filtering and limiting action for the Zener diode 20, and to provide an operating bias for the unijunction transistor 40. The Zener diode 20 operates as a filter and voltage regulator. It generates the bias across resistor 18. It provides just the right amount of filtering to prevent the relay 42 from chattering and yet permit the circuit to function in the desired manner.

The cathode of the diode 16 is also connected to a variable resistor 24 which, in turn, is connected to a resistor 26 and to a capacitor 38. The resistor 24 may have a variable resistance value up to, for example, 75,000 ohms, and this resistor serves to control the sensitivity of the circuit. The resistor 26 is connected to the gate electrode of the unijunction transistor 40. The resistor 26 may have a value, for example, of 1 kilo-ohm. The resistor 26 functions as a filter resistor for the unijunction transistor 40. In addition, the resistor 26 and the resistor 24 serve as the upper portion of a voltage divider for the gate electrode of the transistor 40.

A resistor 29, the sensing element A, and a resistor 30 serve as the lower portion of the voltage divider. The sensing element A is connected between a pair of terminals 50, the resistor 29 is connected to one of the terminals 50 through a diode 32, and the resistor 30 is connected to the $V_x-$ lead and to the other terminal 50. The resistor 29 is also connected to a capacitor 38 which in turn, is connected to the junction of the resistors 24 and 26. A capacitor 36 is connected to the gate and to the anode of the programable unijunction transistor 40, the anode of the programable unijunction transistor being connected to the $V_x+$ lead. The programable unijunction transistor 40 (PUT) may be of the type presently designated 2N6027, or 2N6028.

The cathode of the programable unijunction transistor 40 is connected through a relay coil 42 to the $V_x-$ lead, the relay coil being shunted by a diode 34. The capacitor 36 may have a capacity, for example, of .05 microfarads. This capacitor functions as a decoupling means to isolate the unijunction transistor 40 from line voltage transients. The resistor 29 may have a resistance of 100 kilo-ohms. This resistor functions as a gate limit and isolating resistor for the unijunction transistor.

The capacitor 38 may have a capacity of 0.02 microfarads. This latter capacitor functions as a decoupling device, like the capacitor 36 to isolate the unijunction transistor 40 from line voltage transients. The diode 32 serves to isolate the gate electrode of the programable unijunction transistor 40 from large positive voltage transients, and to minimize the capacitance effect of long connecting cables between the sensing element A and the terminals 50. The resistor 30 may have a resistance of 10 kilo-ohms. This resistor functions as an input isolating resistor.

The relay coil 42 may be a direct current type of relay coil with a resistance, for example, of 500 ohms, and with a power consumption of approximately 1.5 watts. The relay control by the relay coil 42 may, for example, be a two-pole or three-pole double-throw relay, or other appropriate type. The diode 34 connected across the relay coil 42 serves to allow the unijunction transistor 40 to shift from a conductive to a non-conductive state when the resistance of the sensing element A is restored to its original value.

The circuit of FIG. 1 may be made to be of the latching type by the omission of the diode 34. Then, whenever the unijunction transistor 40 is rendered conductive due to the resistance of the sensing element A dropping below a particular value, the unijunction transistor cannot be restored to its non-conductive state until the exciting power to the system is momentarily interrupted. This means that the control or indication effectuated by the activation of the relay contacts operated by the relay coil 42 will continue whenever the relay is activated, until a physical reset operation is instituted to restore the system to its original condition.

It will be appreciated that when the resistance of the sensing element A is above a preset value, as established by the setting of the resistor 24, the unijunction transistor 40 is non-conductive, due to the bias voltage established at its gate by the voltage divider formed by resistors 24, 26 and 29, A, 30. However, when the resistance of the sensing element A drops below a particular value, even to a minute extent, the unijunction transistor 40 responds, and creates a current in the relay coil 42 to activate the monitoring system controlled by the relay coil. A wide range of resistance sensitivities can be achieved by changing the value of the resistor 24.

As discussed above, when the diode 34 is connected across the relay coil, the unijunction transistor 40 will be restored to its non-conductive state when the resistance of the sensing element A is restored to its original value, so as to deactivate the relay. However, if the diode 34 is omitted, the relay will remain energized, even after the resistance of the sensing element A is restored to its original value, and until the excitation power to the system is momentarily interrupted to restore the system to a reset condition.

Figure 2:
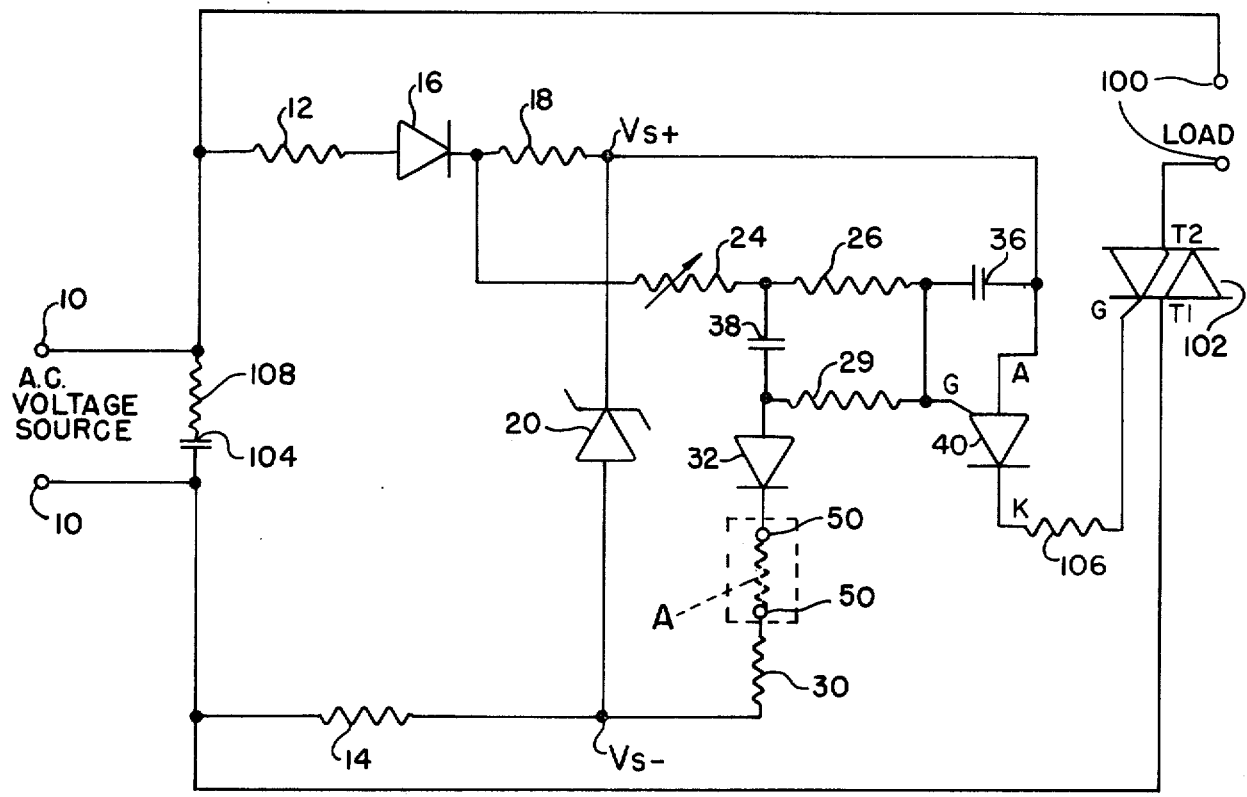
FIG. 2 is a circuit diagram of a second embodiment of the invention which is fully solid state, and in which the relay is replaced by a Triac.

The circuit of FIG. 2 is generally similar to the circuit of FIG. 1, and like elements have been represented by the same numbers. In the circuit of FIG. 2, a Triac 102 has been interposed to replace the relay coil between the programable unijunction transistor 40 and the load, which, as before, may be a control or indicator instrumentality. The load, in the circuit of FIG. 2, is connected across the terminals 100.

In the particular circuit of FIG. 2, the cathode of the programable unijunction transistor 40 is connected through a resistor 106 to the gate of the Triac 102. The main terminal 2 of the Triac 102 is connected to the terminal 100, and its main terminal 1 is connected to one of the input terminals 10. The other input terminal 10 is connected to the other load terminal 100. A resistor 108 and capacitor 104 are connected in series across the input terminals 10.

The system of FIG. 2, unlike the system of FIG. 1, is completely solid state, and it permits on-off switching of the load without isolation from the power source terminals 10. The function of the Triac 102 is to switch the load connected between the terminals 100 on and off respectively, dependent on the signal applied to its gate through the resistor 106. The Triac 102 may be of the type presently marketed by the General Electric Company, and designated as GE SC146.

The resistor 106 may have a resistance value, for example, of 6.8 kilo-ohms. The function of the resistor 106 is to limit the gate trigger currents supplied to the Triac 102 by the unijunction transistor 40. The capacitor 104 may have a capacitance value, for example, of 0.1 microfarads, and the resistor 108 may have a resistance value, for example, of 100 ohms. The function of the capacitor 104 and resistor 108 is to suppress power line transient voltages which could otherwise inadvertently switch the Triac 102 to its conductive state.

The operation of the circuit of FIG. 2 is generally similar to that of FIG. 1. In the circuit of FIG. 2, when the unijunction transistor 40 is rendered conductive, the resulting current flow from the gate to main terminal 1 of the Triac 102 causes the Triac to become conductive, so that a high alternating current may flow through the Triac 102 from the terminals 10 and through the load connected to the terminals 100. In the circuit of FIG. 2, whenever the resistance of the sensing element A is restored to its original value, the unijunction transistor 40 becomes non-conductive, and the Triac 102 is cut off.

Figure 3:
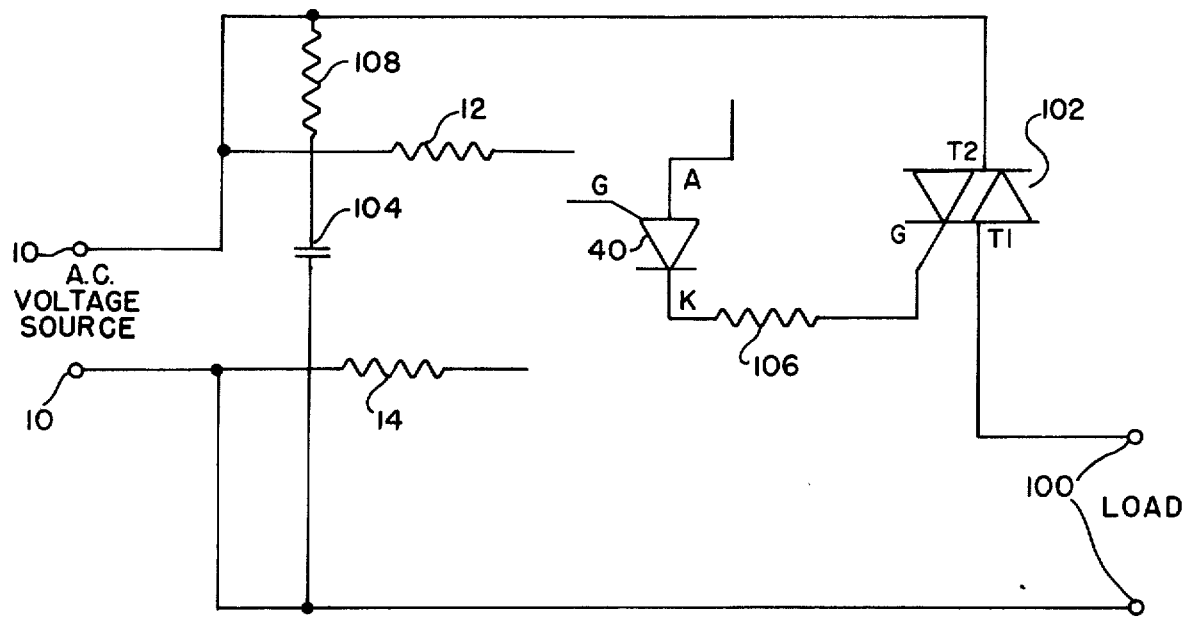
FIG. 3 is a circuit diagram of a third embodiment of the invention, which is similar to the embodiment of FIG. 2, but which has been modified to have latching capabilities.

The circuit of FIG. 3 is generally similar to that of FIG. 2, except that in the circuit of FIG. 3, once the unijunction transistor 40 is rendered conductive by the sensing element A, it remains conductive, as does the Triac 102, for latching purposes, until the exciting power to the circuit is momentarily interrupted.

In the embodiment of FIG. 3, the load is connected in the main terminal 1 circuit of the Triac, rather than in the main terminal 2 circuit. With such a connection, the circuit is not restored to a non-conductive state when the resistance of the sensing element A returns to its normal value and, as stated above, the circuit can be reset only by momentarily interrupting the exciting power.

The invention provides, therefore, an improved control system which is extremely sensitive in its operation, and which serves to control an appropriate load, either through a relay, or through a solid state element. As stated above, the system of the invention is advantageous in that it is relatively simple in its construction, and yet is extremely sensitive and most reliable in its operation. The system of the invention has the further advantage in that it can be simply adjusted to respond to a wide variety of sensing element resistance values.

While particular embodiments of the invention have been shown and described, modifications may be made. It is intended in the claims to cover the modifications which come within the spirit and scope of the invention.

What is claimed:

1. An electronic control system including:
   a rectifying input circuit to be connected to an alternating current voltage source and having a positive lead and a negative lead across which a unidirectional operating potential is established;
   a programable unijunction transistor having anode and cathode electrodes and having a gate electrode;
   a controllable electric device connected in series with the anode and cathode electrodes of said unijunction transistor across the positive and negative leads of said rectifying input circuit;
   resistance means;
   a resistance-sensitive sensing element connected with said resistance means as a voltage divider across the positive and negative leads of said rectifying input circuit; and
   further resistance means connecting the gate electrode of said unijunction transistor to a point on said voltage divider.

2. The electronic control system defined in claim 1, and which includes a variable resistor in said first-named resistance means.

3. The electronic control system defined in claim 1, in which said controlled electric device comprises a relay coil.

4. The electronic control system defined in claim 3, and which includes a diode connected across said relay coil.

5. The electronic control system defined in claim 1, in which said controlled electric device comprises a bidirectional triode thyrister, having gate, main terminal 1 and main terminal 2 electrodes, and in which the cathode of said unijunction transistor is connected to the gate electrode of said bidirectional triode thyrister.

6. The electronic control system defined in claim 5, in which the main terminal 1 of said bidirectional triode thyristor is connected to one terminal of the alternating current voltage source, and the main terminal 2 of said bidirectional triode thyristor is connected through a load to the other terminal of said source.

7. The electronic control system defined in claim 5, in which the main terminal 1 of said bidirectional triode thyristor is connected through a load to one terminal of the alternating current voltage source, and in which the main terminal 2 of said bidirectional triode thyristor is connected to the other terminal of said source.

8. The electronic control system defined in claim 1, and which includes a Zener diode connected across the positive and negative leads of said rectifying input circuit.

* * * * *